US009637000B2

(12) United States Patent
Husson et al.

(10) Patent No.: US 9,637,000 B2
(45) Date of Patent: May 2, 2017

(54) TRACTOR WITH HYBRID POWER SYSTEM

(71) Applicant: AGCO SA, Beauvais (FR)

(72) Inventors: Geoffroy Husson, Beauvais (FR); Malcolm Shute, St Germain la Poterie (FR); Gabriel Menier, Beauvais (FR)

(73) Assignee: AGCO SA, Beauvais (FR)

( * ) Notice: Subject to any disclaimer, the term of this patent is extended or adjusted under 35 U.S.C. 154(b) by 0 days.

(21) Appl. No.: 14/680,283

(22) Filed: Apr. 7, 2015

(65) Prior Publication Data
US 2015/0210151 A1 Jul. 30, 2015

Related U.S. Application Data

(63) Continuation of application No. 13/696,500, filed on Nov. 6, 2012, now Pat. No. 9,067,493.

(51) Int. Cl.
*B60K 1/02* (2006.01)
*B60K 6/46* (2007.10)
(Continued)

(52) U.S. Cl.
CPC .............. *B60K 17/28* (2013.01); *B60K 6/46* (2013.01); *B60W 10/08* (2013.01); *B60W 20/00* (2013.01);
(Continued)

(58) Field of Classification Search
CPC ... B60K 1/02; B60K 6/44; B60K 6/46; B60K 6/52; B60K 25/06; B60K 2025/005; B60K 2025/022
(Continued)

(56) References Cited

U.S. PATENT DOCUMENTS 2,888,998 A * 6/1959 Senkowski ............ B60K 17/28
180/53.4
3,577,002 A * 5/1971 Hall ...................... H02K 7/003
290/46

(Continued)

FOREIGN PATENT DOCUMENTS

DE  29724646 U1  8/2002
EP  0693392 A1  1/1996
(Continued)

OTHER PUBLICATIONS

European Patent Office, International Search Report for International Patent Application No. PCT/EP2011/057022, date of mailing Aug. 19, 2011.
(Continued)

*Primary Examiner* — Frank Vanaman

(57) ABSTRACT

A tractor includes an internal combustion engine for delivering torque, wheels or tracks for imparting a propulsive force to the ground, and a power takeoff shaft for delivering torque to implements attached thereto. The power takeoff shaft is driven by a mechanical drive connection to the engine. An electrical motor/generator is drivingly connected to the engine, and at least one electrical motor is arranged to deliver a propulsion force to the wheels or tracks. The motor is electrically connected to, and powered by, the electrical motor/generator. A battery is connected to the electrical motor/generator and to the electrical motor so that electrical energy can be passed therebetween. The motor/generator can also operate as a motor so that the power takeoff shaft is at least partially powered by electrical energy from the battery.

5 Claims, 11 Drawing Sheets

(51) Int. Cl.
*B60K 6/52* (2007.10)
*B60K 25/06* (2006.01)
*B60K 17/28* (2006.01)
*B60W 10/08* (2006.01)
*B60W 20/00* (2016.01)
*B60W 30/188* (2012.01)
*B60K 25/02* (2006.01)
*B60K 25/00* (2006.01)

(52) U.S. Cl.
CPC ... *B60W 30/1888* (2013.01); *B60K 2025/005* (2013.01); *B60K 2025/022* (2013.01); *B60Y 2200/221* (2013.01); *Y02T 10/6217* (2013.01); *Y10S 903/903* (2013.01)

(58) Field of Classification Search
USPC ..... 180/65.22, 65.245, 242, 243, 53.1, 53.5, 180/53.62; 903/910, 911
See application file for complete search history.

(56) References Cited

U.S. PATENT DOCUMENTS

| | | | |
|---|---|---|---|
| 3,822,655 A | 7/1974 | Benedict et al. | |
| 4,090,362 A | 5/1978 | Bourque | |
| 4,346,773 A * | 8/1982 | Hofbauer | B60K 6/105 180/165 |
| 4,405,031 A * | 9/1983 | Rotter | B60K 6/105 180/165 |
| 4,459,536 A | 7/1984 | Wirtz | |
| 4,550,280 A * | 10/1985 | Freise | F02N 11/04 310/168 |
| 4,797,602 A * | 1/1989 | West | F02N 11/04 290/46 |
| 4,953,646 A | 9/1990 | Kim | |
| 4,982,799 A * | 1/1991 | Fujimoto | B62D 7/1509 172/2 |
| 5,214,358 A | 5/1993 | Marshall | |
| 5,285,862 A | 2/1994 | Furutani et al. | |
| 5,337,848 A | 8/1994 | Bader | |
| 5,418,400 A * | 5/1995 | Stockton | F02N 11/04 290/22 |
| 5,669,842 A | 9/1997 | Schmidt | |
| 5,794,422 A | 8/1998 | Reimers et al. | |
| 5,928,301 A * | 7/1999 | Soga | B60K 6/365 477/31 |
| 5,950,735 A * | 9/1999 | Godbersen | A01B 59/062 172/439 |
| 6,119,789 A * | 9/2000 | Taylor | A01B 59/042 172/439 |
| 6,540,035 B2 | 4/2003 | Nagano et al. | |
| 6,581,706 B2 | 6/2003 | Bordini | |
| 7,028,795 B2 | 4/2006 | Tabata | |
| 7,350,603 B2 | 4/2008 | Takami et al. | |
| 7,610,975 B1 | 11/2009 | Gust et al. | |
| 2003/0102174 A1 | 6/2003 | Bordini | |
| 2007/0080236 A1 | 4/2007 | Betz | |
| 2008/0121448 A1 | 5/2008 | Betz | |
| 2008/0243324 A1 | 10/2008 | Harris | |

FOREIGN PATENT DOCUMENTS

| | | |
|---|---|---|
| EP | 1205338 A2 | 5/2002 |
| JP | 2007269072 A | 10/2007 |
| WO | 2007031396 A1 | 3/2007 |
| WO | 2009009078 A1 | 1/2009 |

OTHER PUBLICATIONS

Intellectual Property Office, Search Report for UK Application No. GB1007566.1, dated Aug. 18, 2010.

* cited by examiner

TRACTOR WITH HYBRID POWER SYSTEM

CROSS-REFERENCE TO RELATED APPLICATION

This application is a continuation application of U.S. application Ser. No. 13/696,500, entitled TRACTOR WITH HYBRID POWER SYSTEM, filed Nov. 6, 2012, which is incorporated herein by reference.

FIELD OF THE INVENTION

The invention relates to agricultural tractors which employ an internal combustion engine for a primary source of power, wheels or tracks for imparting a propulsive force to the ground, and a power takeoff shaft for delivering torque to implements attached thereto.

BACKGROUND

Employed for agricultural purposes for decades, tractors have a basic architecture that has not changed significantly since their conception. Still today modern tractors typically include an internal combustion engine mounted forwardly of a transaxle. The transaxle itself houses a transmission and the required drive mechanics to drive a pair of rear wheels attached thereto. The engine and transaxle together commonly provide the chassis for supporting other components, thereby dispensing for the need for heavy support frames. For example, a front axle is typically suspended below the engine compartment and a driver's cab may be suspended above the transaxle. Although variations have been proposed the majority of tractors in use today employ this architecture.

From low horsepower utility tractors through to high horsepower agricultural tractors, a power take off (PTO) shaft is usually provided to deliver torque to implements attached to the tractor. Traditionally, the PTO shaft was located at the rear of the vehicle but the introduction of front mounted implements has seen a growth in the number of tractors with front PTO shafts in addition. Implements which exploit the torque delivered by PTO shafts range from low-power fertilizer spreaders to power hungry cultivation equipment.

Driven by the demands of ever-stricter emissions regulation, attempts have been made to reduce harmful emissions from internal combustion engines whilst also improving the efficiency of power extraction from the engine. The use of electrical motors and generators as used in some hybrid systems in automotive cars has been considered. However, the power demand characteristics of a tractor are significantly different to that of an automotive car.

International patent application publication WO-2007/031396 discloses a drive system for an agricultural tractor wherein an internal combustion engine drives an electric generator. The power created by the generator is utilised to power a plurality of electric motors to propel the vehicle. The engine also drives, via a mechanical connection, a PTO shaft for transferring a drive torque to an attached implement.

It is an object of the invention to provide an improved hybrid power system for a tractor.

SUMMARY OF INVENTION

In accordance with a first aspect of the invention there is provided a tractor comprising an internal combustion engine for delivering torque, wheels or tracks for imparting a propulsive force to the ground, and a PTO shaft for delivering torque to implements attached thereto, a mechanical drive connection between the engine and the PTO shaft, an electrical generator drivingly connected to the engine, and at least one electrical motor arranged to deliver a propulsion force to the wheels or tracks, the at least one electrical motor being electrically connected to, and powered by, the electrical generator, characterised in that the tractor further comprises a battery connected to the electrical generator and to the electrical motor, and a first motor/generator which provides said electrical generator drivingly connected to the engine, and to which the battery is connected so that electrical energy can be passed therebetween, wherein the first motor/generator can operate as a motor so that the power takeoff shaft is at least partially powered by electrical energy from the battery. The PTO shaft is, therefore, driven by a mechanical drive connection with the engine whilst the wheels or tracks employ at least one electric motor to provide the propulsion force. The invention involves the recognition that the infinitely variable power transmission associated with a diesel-electric system offers little benefit to a PTO drive on a tractor. It is recognised that during use, the PTO shaft is driven at a constant speed and so a mechanical drive connection with the engine is not only sufficient but delivers optimal efficiency in power transmission.

The electrical connection between the electric motor and the electric generator facilitates an infinitely variable transmission of power between the internal combustion engine and the wheels or tracks thereby dispensing of the requirement for a traditional mechanical transmission. Of course is should be appreciated that at least one gear box may be required between the electrical motor and the wheels or tracks to deliver the necessary torque. However the requirement for multiple input-to-output ratios is no longer present.

In automotive car technology the hybridisation of the power delivery seeks to downsize the engine required and to draw upon electrical energy stored in the battery during periods of higher power demand, for example during acceleration. This hybrid technology approach cannot be mapped directly across to tractor application because the maximum power output of the engine is demanded for long periods of time. Therefore, downsizing of the engine is not practical.

In existing tractors the diesel engines employed typically have their maximum power at around 2000 rpm whilst their maximum torque is delivered at around 1500 rpm with about a 15% rise in torque between the point of maximum power and the point of maximum torque. When used during high load applications (such as cultivation) the engine is driven around the maximum power point (2000 rpm) and any overload in power demand is catered for by a rise in torque through a drop in engine speed, thus avoiding stalling of the engine. The inventor has recognised that in order to exploit the most efficient output of an engine, it must be driven around the point of maximum torque. In order to deliver an equivalent maximum power to existing tractors the engine used for a diesel electric system in a tractor should be upsized. This allows the engine to be driven at its most efficient engine speed while still delivering the required power.

Due to the mechanical disconnect provided by the diesel-electric drive to the wheels or tracks, the engine can be driven at a relatively constant speed which is preferably chosen around the maximum torque rating. To handle any transient overload from the PTO shaft or the wheels or tracks, the battery, as in automotive technology, can be drawn upon to supply extra electrical power.

To maintain the advantage of an infinitely variable transmission the invention employs serial or power-splitting hybrid technology to deliver power to the wheels or tracks, whilst parallel hybrid technology is employed to drive the PTO shaft.

The first motor/generator is connected to the battery which allows electrical energy to pass therebetween. In addition to acting as a generator, the first motor/generator can alternatively operate as a motor so that the PTO shaft is at least partially powered by electrical energy from the battery. Advantageously, the first motor/generator facilitates the parallel hybrid drive to the PTO shaft wherein stored electrical energy can be drawn upon to drive the PTO shaft. The first motor/generator operates as a motor when the engine cannot deliver enough power to the PTO shaft during transient periods of high power demand. During such period the battery delivers power to the first motor/generator to drive the PTO and also to the electric motor associated with the drive to the wheels or tracks.

Initial simulations of the inventive system have shown that a saving of between 5 and 20% of fuel can be made depending on the implement attached to the tractor.

In a preferred arrangement the first motor/generator is driven directly from the mechanical drive connection that exists between the engine and the PTO shaft. Alternatively the first motor/generator can be driven from a second engine drive shaft.

The at least one electrical motor that is arranged to deliver a propulsion force to the wheels or tracks can form part of a second motor/generator which is connected to the battery. In addition to serving as an electrical motor, the second motor/generator can alternatively operate as a generator which converts torque recovered from the wheels or tracks into electrical energy which can be delivered to, and stored by, the battery. The recovery of torque from the wheels or tracks can provide a braking effect thus, advantageously, reducing overall power consumption.

It should be appreciated that any electrical connections between generators, motors and batteries may be made via any number of control units which serve to switch and distribute the electrical energy between the various electrical components as required.

In a first embodiment, the tractor further comprises an epicyclic gearbox having three input/outputs, wherein a first input/output is drivingly connected to the mechanical drive connection, a second input/output is drivingly connected to the at least one electrical motor, and a third input/output is drivingly connected to the wheels or tracks, and wherein torque provided by the engine is summed with torque provided by the at least one electrical motor and delivered as a driving force to the wheels or tracks. Advantageously, the epicyclic gearbox provides a mechanical connection between the engine and the wheels or tracks. By the very nature of an epicyclic gearbox the torque delivered by the direct mechanical connection is summed with the torque from the electric motor for delivery to the wheels or tracks. Either the direct mechanical connection or the electric motor input can be held stationery thereby allowing the other two as the sole torque supplier. The epicyclic gearbox may be housed within a transaxle which provides and axle for two wheels, typically the rear wheels.

The tractor may further comprise a first differential gearbox arranged to deliver at least a portion of the propulsion force to a first pair of wheels on a first axle thereby allowing two wheels to be driven by a single electric motor. The tractor may further comprise a second differential gearbox arranged to deliver at least a portion of the propulsion force to a second pair of wheels. The tractor may further comprise a third differential gearbox which divides the propulsion force between the first and second differential gearboxes. Advantageously, this allows all four wheels of a tractor to be driven by a single electric motor. In a preferred arrangement the third differential gearbox comprises a differential which divides the torque between the front and rear axle. This differential could be a torque sensing ('torsen') differential).

In one preferred embodiment the at least one electrical motor delivers the propulsion force to the first pair of wheels and a second electric motor, also connected to, and powered by, the electrical generator, delivers a propulsion force to a second pair of wheels via a second differential gearbox. Therefore each pair of wheels is driven by a respective electrical motor allowing different torques to be applied to the respective axles and, in turn, providing the hardware to control traction to a greater extent.

It should be appreciated that a four-wheeled tractor in accordance with the invention may include one of many permutations of differential gearbox and electric motor combinations to deliver the propulsion force. For example the rear wheels of a tractor in accordance with the invention may be powered by a single electric motor wherein the torque is divided by a first differential gearbox, whilst the front wheels have associated therewith independent electric motors.

In an alternative embodiment the tractor comprises a pair of front wheels and a pair of rear wheels wherein each wheel has associated therewith a respective electric motor arranged to deliver a propulsion force to the wheel via a respective mechanical drive connection, each electrical motor being electrically connected to, and powered by, the electrical generator. The provision of separate electric motors for each wheel dispenses with the need for differential gearboxes whilst still delivering four-wheel drive. Furthermore, the dedicated electric motors allows for better control of the torque applied to each wheel thus improving the control of traction during operation.

The mechanical drive connections associated with the two rear wheels may be connected by a clutch which provides a disengageable mechanical connection between the drive connections of the two rear wheels. Advantageously, this delivers a mechanical lock between the two rear wheels which reduces stress on the associated electric motors and simulates a conventional differential lock.

The mechanical drive connection between the engine and the PTO shaft preferably includes a PTO clutch to allow disengagement of PTO shaft from the torque delivered by the engine. The tractor may further comprise a PTO drive electrical motor being electrically connected to, and powered by, the electrical generator, the PTO drive electrical motor being drivingly connected to the PTO shaft on the output side of the PTO clutch. This allows the PTO shaft to be driven by the PTO drive electrical motor independently of the engine when the PTO clutch is disengaged. This option lends itself well to low-power PTO applications such as fertilizer spreaders and hay equipment.

In yet another embodiment an auxiliary electrical motor is provided and is drivingly connected, via an auxiliary clutch, to the mechanical drive connection between the engine and the PTO shaft. When the auxiliary clutch is open the PTO shaft is driven by the auxiliary electrical motor which is electrically connected to, and powered by, the electrical generator. Therefore, the PTO shaft can be disconnected from the engine and driven solely by the auxiliary motor. Advantageously, this arrangement lends itself well to low power PTO applications when variable speed output is beneficial. Furthermore, the auxiliary motor can be used upon starting of the PTO shaft before closing the auxiliary clutch. This delivers a smooth increase in the PTO speed and reduces stress in the mechanical drive connection to the engine.

The auxiliary electrical motor may be provided by a motor/generator which can serve as a generator when the auxiliary clutch is closed, thereby powering the propulsion motors via the power distribution circuitry.

The tractor may further comprise a hydraulic pump driven by a dedicated electrical motor which is electrically connected to, and powered by, the electrical generator. The hydraulic pump may be utilised to supply pressurised fluid to various systems on the tractor such as implement lift control and braking.

In accordance with a second aspect of the invention there is provided a method of controlling a drive system of an agricultural tractor comprising an internal combustion engine for delivering torque, wheels or tracks for imparting a propulsive force to the ground, a power takeoff shaft for delivering torque to implements attached thereto, a mechanical drive connection between the engine and the power takeoff shaft, an electrical generator drivingly connected to the engine, and at least one electrical motor arranged to deliver a propulsion force to the wheels or tracks, the at least one electrical motor being electrically connected to, the electrical generator, the method comprising operating the drive system in a first mode wherein the at least one electrical motor is powered by the generator, characterised in that the tractor further comprises a battery connected to the electrical generator and to the electrical motor, the method further comprising operating the drive system in a second alternative mode wherein the generator is operated as a motor powered by the battery so that the power takeoff shaft is at least partially powered by electrical energy from the battery.

BRIEF DESCRIPTION OF THE DRAWINGS

Further advantages of the invention will become apparent from the following description of specific embodiments with reference to the appended drawings in which:—

DESCRIPTION OF EXAMPLE EMBODIMENTS

Figure 1:
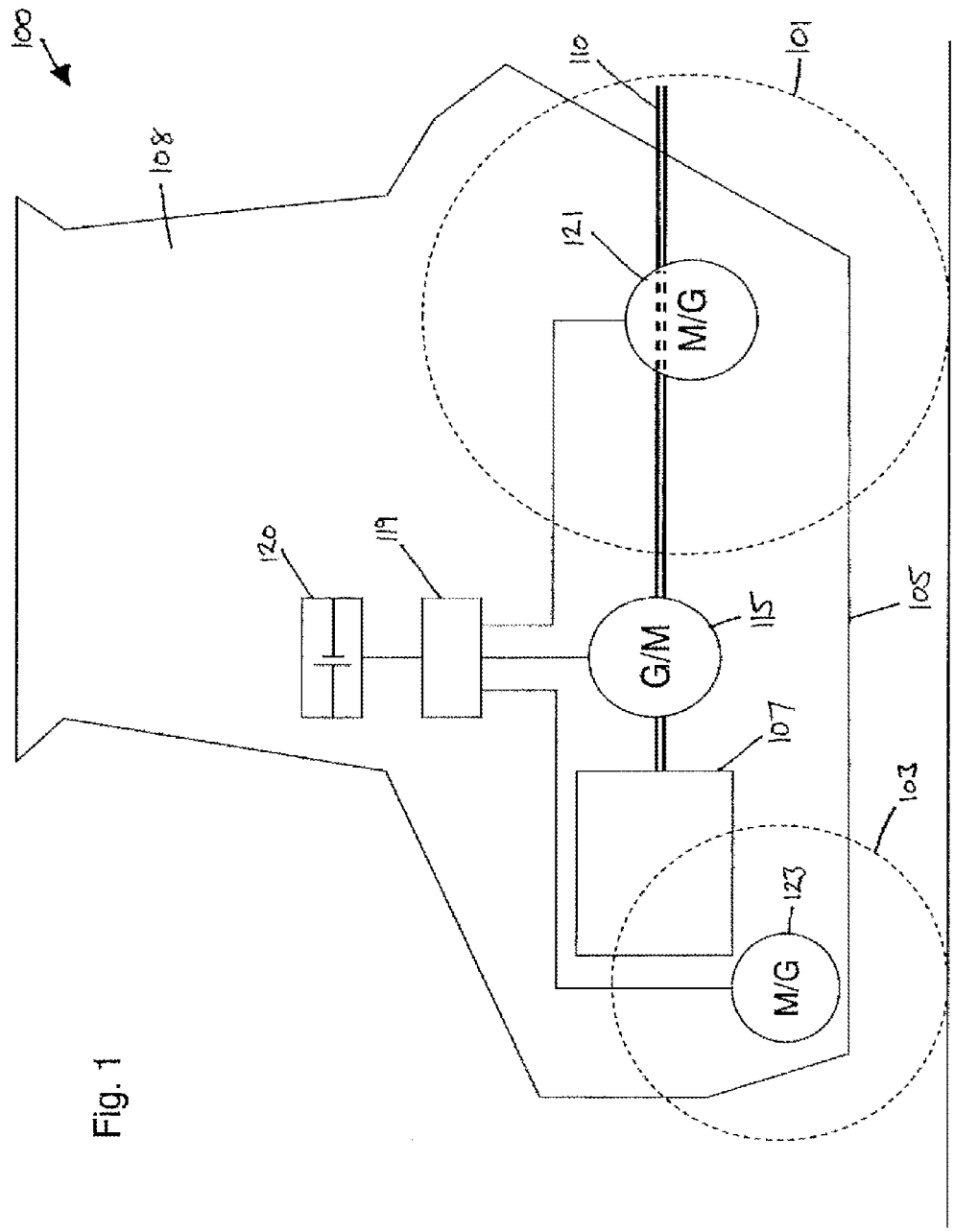
FIG. 1 is a schematic side representation of a tractor in accordance with a first embodiment of the invention.

With reference to FIG. 1 a tractor 100 comprises two rear wheels 101,102 and two front wheels 103,104. The tractor 100 comprises a frame 105 which includes a transaxle 106 (FIGS. 3 and 4) and provides a supporting structure, or chassis, for a diesel fuelled internal combustion engine 107 and a driver's cab 108. Each of the two rear wheels 101,102 are mounted to the transaxle 106 which will be described in more detail below. The two steerable front wheels 103,104 are pivotally mounted on respective ends of a front axle 109. Alternatively, each front wheels 103,104 may be suspended from the frame 105 by independent wheel suspension or conventional suspended axle assemblies known in the art.

The tractor 100 further comprises a power take off (PTO) shaft 110 which terminates in a stub externally of the tractor frame 105 and serves to deliver torque to implements attached to the tractor such as balers, sprayers and cultivation equipment. The invention concerns the distribution of torque from the engine 107 to the PTO shaft 110 and the four wheels 101, 102, 103, 104.

Figure 4:
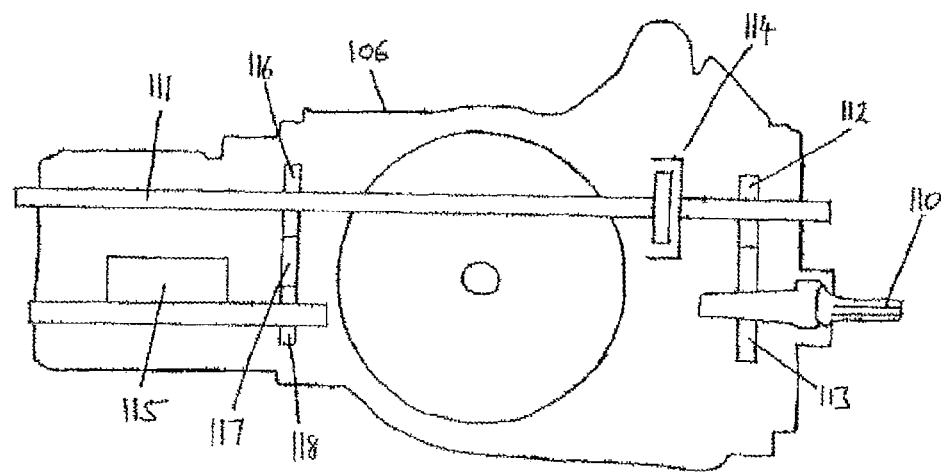
FIG. 4 is a side sectional view of the transaxle of FIG. 3.

The engine 107 powers a driveshaft 111 which is aligned longitudinally with respect to the normal direction of travel of the tractor 100, the driveshaft 111 terminating at the rear of the tractor. PTO shaft 110 is driven mechanically by the driveshaft 111 via a pair of meshed gears 112,113 as shown in FIG. 4. It should be appreciated that the schematic representations in FIGS. 1 and 2 omit the gears 112,113 for simplicity. The driveline which includes driveshaft 111 and gears 112,113, and which delivers torque from the engine 107 to the PTO shaft 110, includes a PTO clutch 114. The PTO clutch 114 allows the PTO shaft 110 to be disengaged from the driveshaft 111 thus allowing selective drive engagement.

In an alternative arrangement the driveshaft 111 may simply terminate at the rear of the tractor 100 and provide the PTO shaft 110 thus dispensing with the need for gears 112,113. Alternatively further still, a PTO gearbox may be provided in the driveline to permit varying input-to-output ratios. For example the PTO gearbox may provide two operation PTO speeds at working engine speed, 540 rpm and 1000 rpm as per known tractors. In any case, a mechanical drive connection is provided between the engine and the PTO shaft in accordance with the invention.

Turning back to FIGS. 1 to 4, the tractor 100 comprises a first motor/generator 115 which is drivingly connected to the driveshaft 111 via meshed gears 116, 117, 118 (FIG. 4). The first motor/generator 115 is electrically connected to a power control unit 119 which serves to distribute electrical energy to various components on the tractor 100. The mechanical drive connection between the first motor/generator 115 and the driveshaft 111 allows the first motor/generator to act as a generator which is powered by the engine 107.

The tractor 100 further comprises a battery 120 which is connected to the power control unit 119. The battery 120 facilitates the storage of electrical energy which can be distributed as required by the power control unit 119. When acting as a generator first motor/generator 115 generates electrical energy which can be stored by battery 120.

Figure 3:
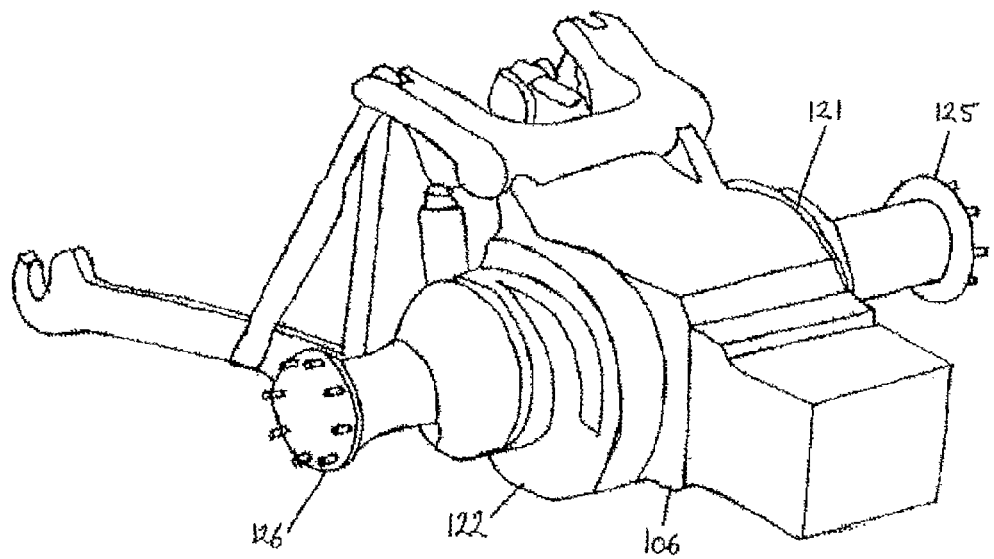
FIG. 3 is a perspective view of a transaxle in accordance with the first embodiment of the invention.

Each wheel 101-104 has associated therewith a respective motor/generator 121-124, hereinafter termed 'propulsion motor/generators'. Each propulsion motor/generator 121-124 is electrically connected to power control unit 119 and is arranged to deliver a propulsion force to the associated wheel via a respective mechanical drive connection (not shown). With reference to FIG. 3, each of the rear wheels 101,102 (not shown in FIG. 3) is secured to wheel hubs 125,126 respectively. Each propulsion motor/generator 121-124 can act as a motor wherein a propulsion force is delivered by each propulsion motor/generator 121-124 to the associated wheel 101-104 by the aforementioned mechanical drive connection.

In one mode of operation the first motor/generator 115 is driven by the engine 107 and generates electrical energy which powers the propulsion motor/generators 121-124 via the power control unit 119. The electrical energy stored in the battery 120 can be drawn upon as required to cater for transient increases in power demand by the propulsion motor/generators 121-124. Furthermore any surplus electrical energy generated by first motor/generator 115 can be stored on battery 120.

In accordance with the invention, the PTO shaft 110 is powered by a direct mechanical connection to the engine 107 whilst the wheels 101-104 are powered by propulsion motors 121-124 which are, in turn, powered by a diesel-electric system. Therefore, the need for a mechanical multi-ratio transmission is dispensed with thus saving cost and weight whilst the direct mechanical connection to the PTO shaft provides optimum power transmission efficiency. In other words, the propulsion of the tractor 100 is driven by a serial hybrid diesel-electric system whilst the PTO shaft 110 is driven by a parallel hybrid diesel-electric system.

The first motor/generator 115 can also serve as a motor wherein electrical energy is supplied thereto and which is used to apply additional torque to the driveshaft 111 via meshed gears 116, 117, 118. Advantageously, this provides the parallel hybrid diesel-electric system for the drive of the PTO shaft 110 during transient periods of high power demand.

The propulsion motor/generators 121-124 can also serve as generators which convert torque recovered from the associated wheels 101-104 into electrical energy which can be delivered to and stored in the battery 120 via the electrical control unit 119. This utilizes known serial hybrid technology to exchange a retarding force to the wheels with electrical energy for later use thus saving on the brake systems and increasing power efficiency.

To illustrate the operation of the tractor 100 the diesel engine 107 may be rated at 100 kw (i.e. maximum power). In one mode of operation, the PTO shaft 110 may utilize 30 kw of power via the direct mechanical connection whilst the wheels 101-104 uses 70 kw of power for propulsion of the tractor 100. In this case the first motor/generator 115 generates 70 kw of electrical energy which is distributed by power control unit 119 to the propulsion motor/generators 121-124. If the load power demanded by the PTO shaft 110 increases instantaneously from 30 to 40 kw the additional power can be sourced by the stored electrical energy in the battery 120. In this case, the PTO shaft 110 draws 40 kw of power directly from the engine 107 whilst the first motor/generator 115 (acting as a generator) generates 60 kw of electrical energy which is distributed to the propulsion motor/generators 121-124 together with 10 kw of electrical energy supplied from the battery 120.

In a second example of operation, the PTO shaft draws 90 kw of power from the engine 107, whilst the propulsion motor/generators 121-124 draw only 10 kw of power. The 100 kw engine can sustain this power demand indefinitely. However, if the load power from the PTO shaft 110 increases to 110 kw, the first motor/generator 115 switches to acting as a motor wherein 10 kw of electrical energy is drawn from the battery 120 to drive the driveshaft 111 with a torque demanded by the PTO shaft 110. In addition, another 10 kw of electrical energy is supplied by the battery 210 to provide the propulsion force delivered by the propulsion motor/generators 121-124. It should be appreciated that this overload situation can exist for only a finite period of time which is determined by the size and electrical energy stored on the battery 120.

Turning to the construction of the transaxle 106 shown in FIGS. 3 and 4, the rear propulsion motor/generators 121,122 are integrated into the rear axle and meshed (not shown) with the drive connection to the wheel hubs 125,126. Advantageously, the construction of the transaxle 106 does not differ significantly from known tractors and can therefore be integrated without significant disruption to the existing production process.

Figure 5:
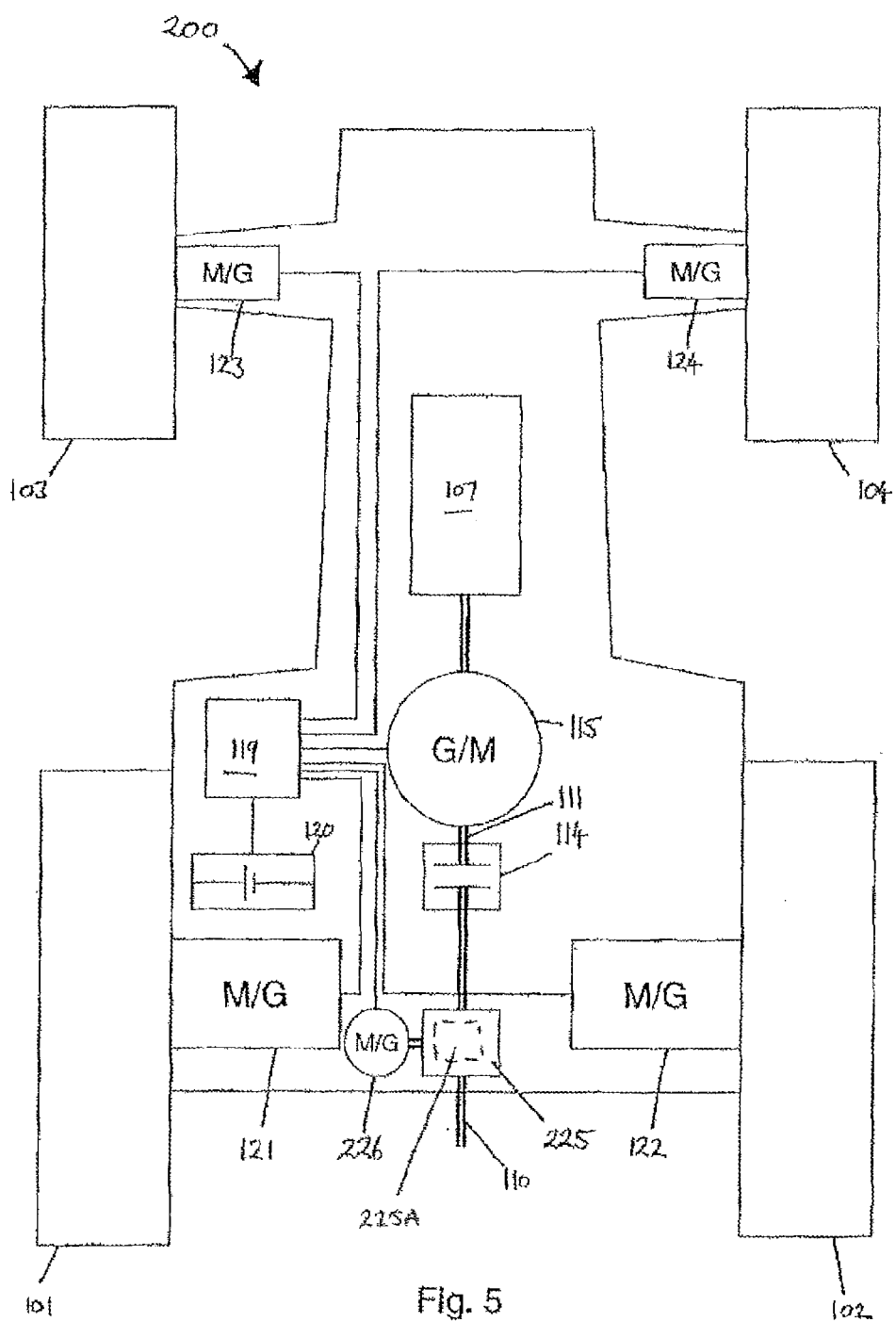
FIG. 5 is a schematic plan view of a tractor in accordance with a second embodiment of the invention.

With reference to FIG. 5, a tractor 200 in accordance with a second embodiment of the invention includes a modified form to that described above in relation to FIGS. 1 to 4. Only the differences between the first and second embodiment will be described and it should be understood that the remaining features are the same as described above.

The output side of PTO clutch 114 is drivingly connected to the PTO shaft 110 via a PTO gearbox 225 which may be an epicyclic unit 225A having three input/outputs. The tractor 200 further comprises a PTO motor/generator 226 drivingly connected to the PTO gearbox 225 and being electrically connected to the power control unit 119. In an alternative, more simplistic, arrangement the PTO motor/generator 226 may be replaced by an electric motor.

The additional hardware provided on tractor 200 allows the PTO shaft 110 to be driven solely by PTO motor/generator 226 whilst the PTO clutch 114 is disengaged. For implements demanding relatively low PTO power input, full electric drive is attractive due to the independence from engine output. In fact, when the propulsion force demanded is low or zero the tractor 200 can operate without the engine 107 running at all relying solely on stored energy in the battery 120.

The PTO motor/generator 226 can also be exploited to initiate rotation of the PTO shaft 110 before engagement of PTO clutch 114. This reduces the stress placed upon the drive shaft 111 and is particularly advantageous for implements presenting a high inertial force upon the PTO shaft 110.

The PTO motor/generator 226 can also serve as a generator wherein torque imparted upon the PTO shaft 110 by inertia from an attached implement can be converted into electrical energy to be stored in battery 120. This functionality can be exploited when operation of the attached implement is ceased whilst the retarding force offered by the PTO motor/generator serves to slow down the implement drive.

The PTO gearbox 225 may be arranged to sum the torques presented by the drive shaft 111 and the PTO motor/generator 226 so as to combine the torque from the engine 107 and the PTO motor/generator 226 for the driving of the PTO shaft 110.

Figure 6:
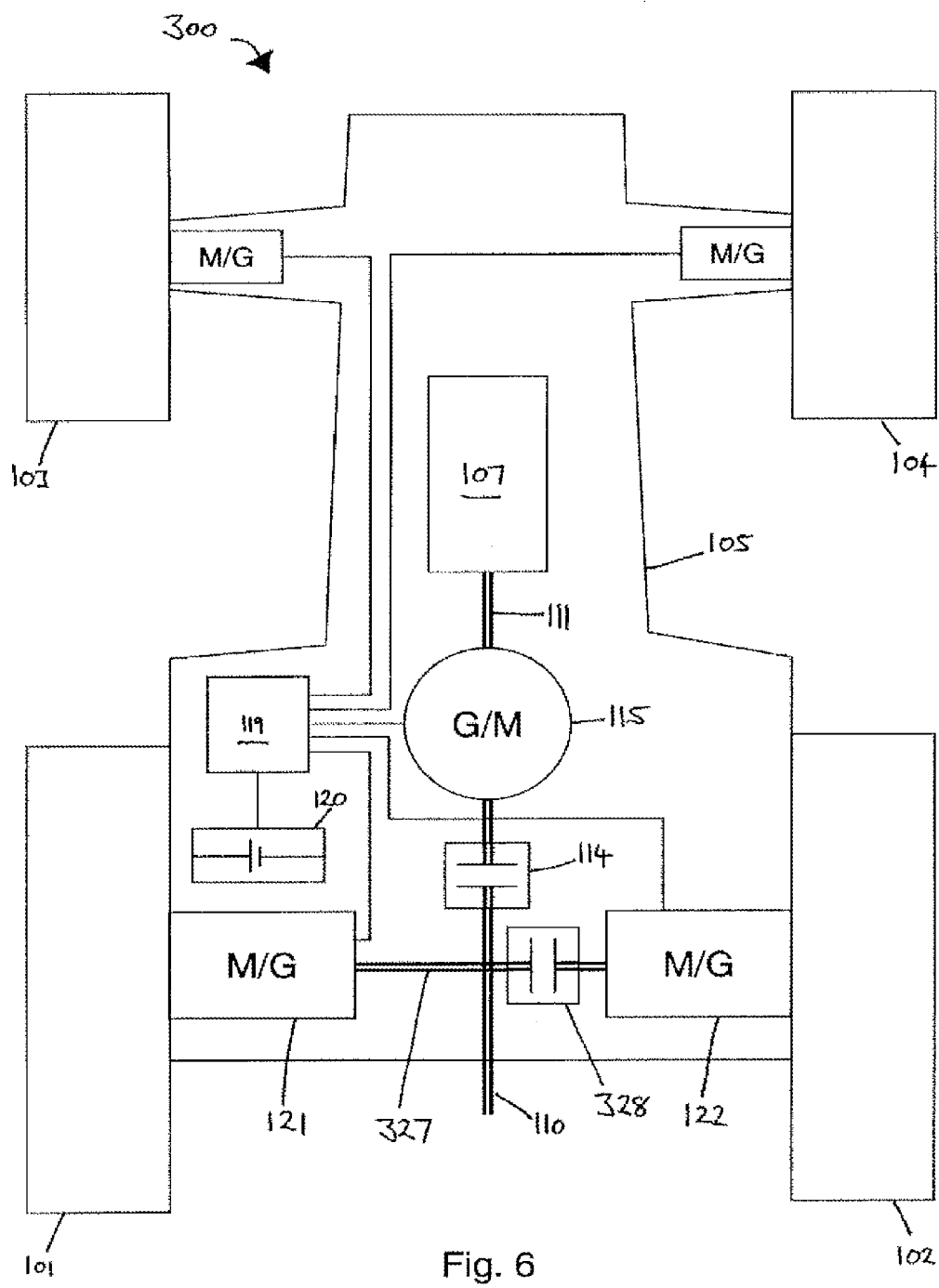
FIG. 6 is a schematic plan view of a tractor in accordance with a third embodiment of the invention.

FIG. 6 shows an alternative modification to the first embodiment of which the same or similar parts will not be described any further. The tractor 300 comprises a disengageable mechanical drive connection between the two rear propulsion motor/generators 121,122. The disengageable drive connection comprises a shaft 327 and a clutch 328. This additional drive connection can be selectively engaged by the driver by appropriate control of clutch 328 to provide a mechanical lock between the propulsion drives of the two rear wheels 101,102. This simulates a rear differential lock present on existing tractors and serves to deliver power from both associated motors during periods of unbalanced traction.

Figure 7:
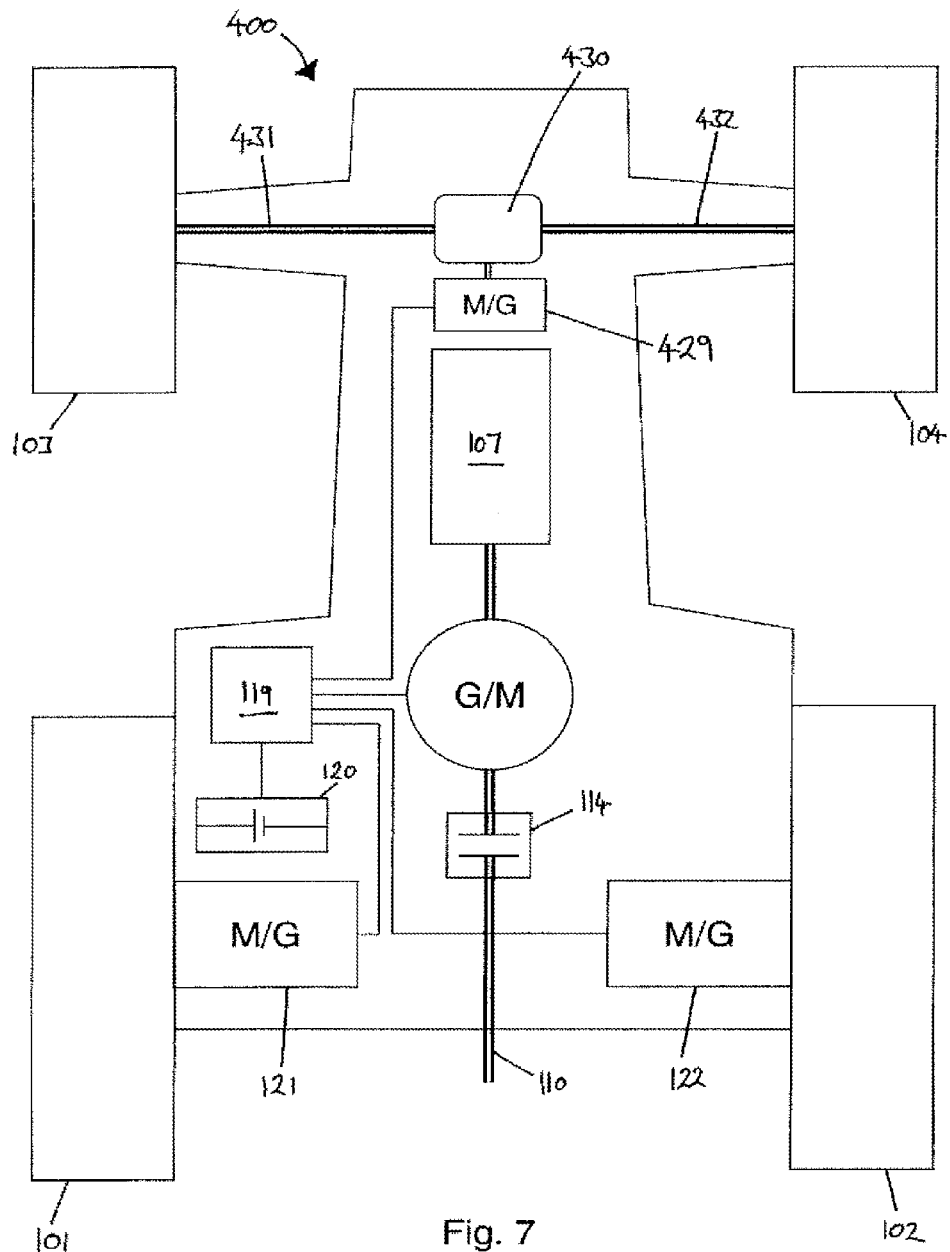
FIG. 7 is a schematic plan view of a tractor in accordance with a fourth embodiment of the invention.

A further adaption of the first embodiment is shown in FIG. 7 in the form of fourth embodiment. In this case the front propulsion motor/generators 123,124 are replaced by a single front propulsion motor/generator 429, the torque generated by which is distributed to the front wheels 103, 104 via a front differential gearbox 430 and respective drive connections 431,432. This arrangement benefits from a reduced number of motor/generator units thus saving overall cost. Furthermore, the single motor/generator 429 can be installed so as to drivingly connect to existing front differentials on known tractors thus reducing development costs.

Figure 2:
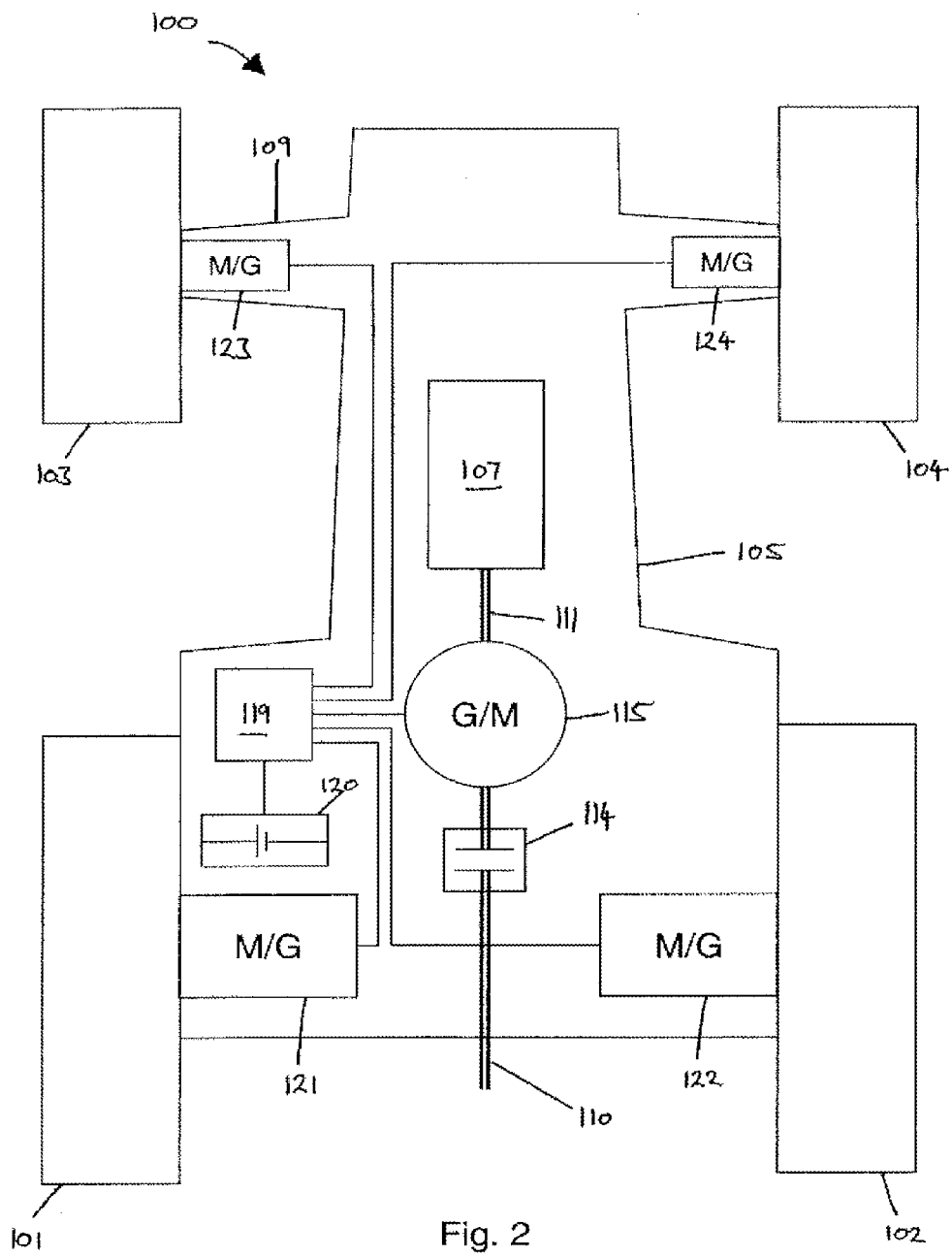
FIG. 2 is a schematic plan representation of the tractor of FIG. 1.
Figure 8:
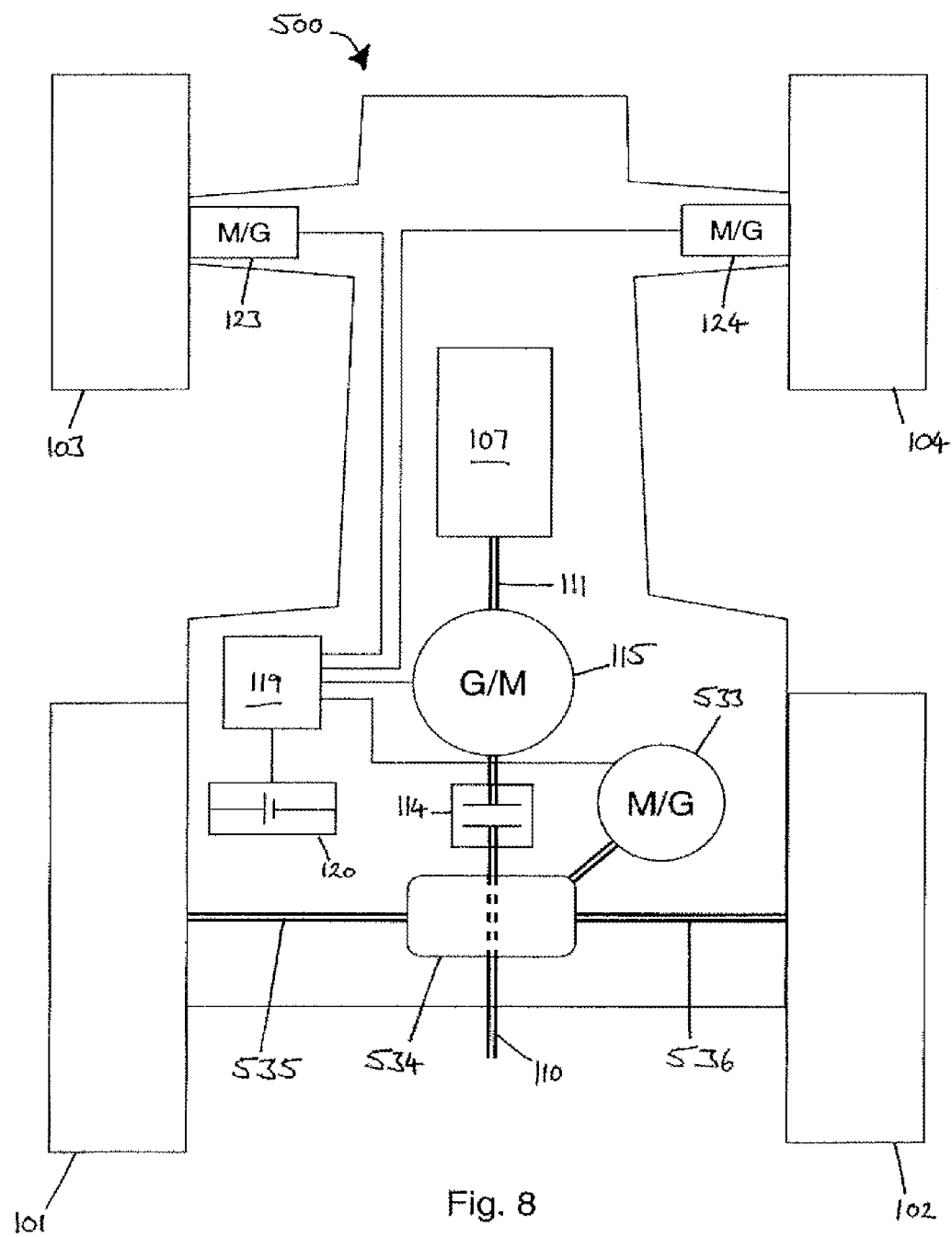
FIG. 8 is a schematic plan view of a tractor in accordance with a fifth embodiment of the invention.

FIG. 8 illustrates an alternative drive system adapted from that shown in FIG. 2 in which the two rear propulsion motor/generators 121,122 are replaced by a single rear propulsion motor/generator 533, the torque from which is distributed to the two rear wheels 101,102 via a rear differential gearbox 534 and respective drive connections 535, 536. It should be understood that the schematic illustration of FIG. 8 shows the rear motor/generator 533 offset from the longitudinal centreline of the tractor 500 but can of course be aligned centrally as space permits. For example the rear motor/generator 533 may be housed centrally within the transaxle where a conventional transmission is typically located.

Figure 9:
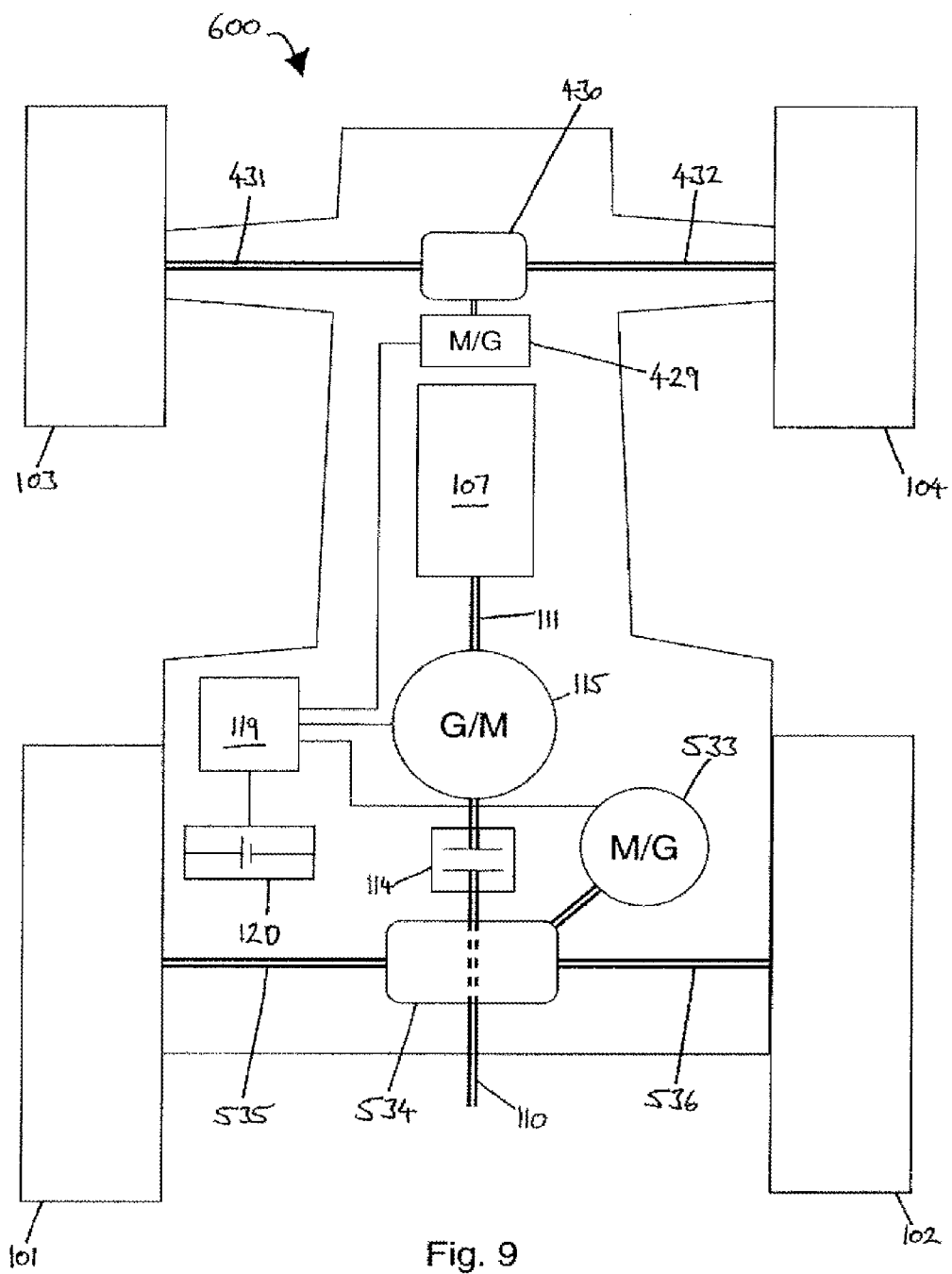
FIG. 9 is a schematic plan view of a tractor in accordance with a sixth embodiment of the invention.

The tractor 600 in accordance with a sixth embodiment of the invention shown in FIG. 9 utilizes a single front propulsion motor/generator 429 (as described above in relation to FIG. 7) in combination with a rear propulsion motor/generator 533 (as described above in relation to FIG. 8). Advantageously, the arrangement shown in FIG. 9 requires only two motor/generator modules for propulsion of the tractor 600 whilst still delivering four wheel drive.

Figure 10:
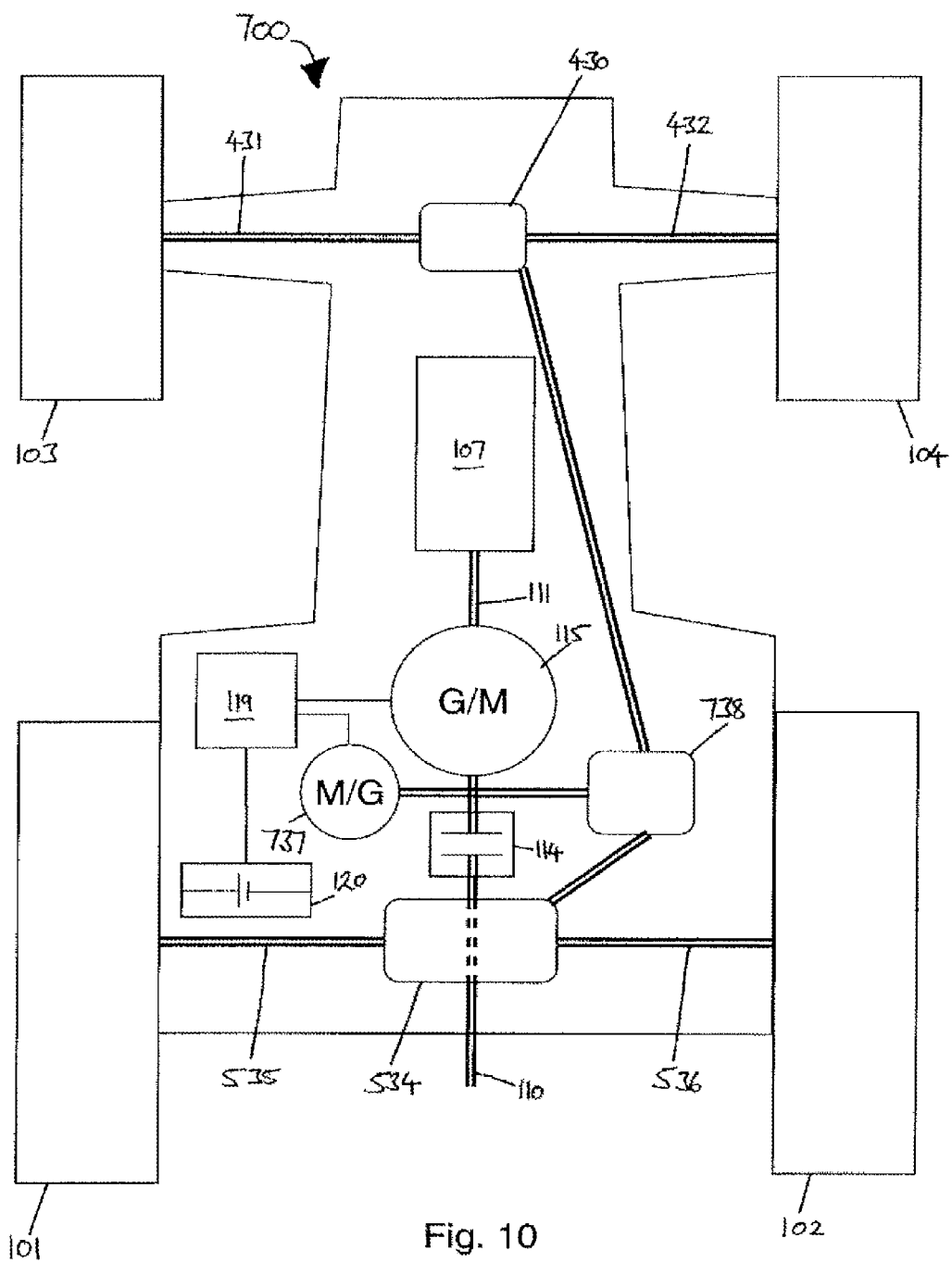
FIG. 10 is a schematic plan view of a tractor in accordance with a seventh embodiment of the invention.

In a further modified arrangement tractor 700 shown in FIG. 10 delivers a propulsion force to all four wheels 101-104 from a single propulsion motor/generator 737, the torque generated by which is distributed to the front and rear differential gearboxes 430, 534 via a torsen, or torque sensitive differential unit 738. Alternatively, a conventional or limited slip clutch may be used. Although shown offset from the longitudinal centre line of the tractor 700, the torsen 738 and/or the propulsion motor/generator 737 may be located centrally on the tractor 700 and are represented in FIG. 10 as such for ease of illustration. The propulsion motor/generator 737 is electrically connected to the power control unit 119 and may also serve as a generator to recover torque by imparting a retarding force on the wheels 101-104 via the respective differential gearboxes 430, 534, 738.

Figure 11:
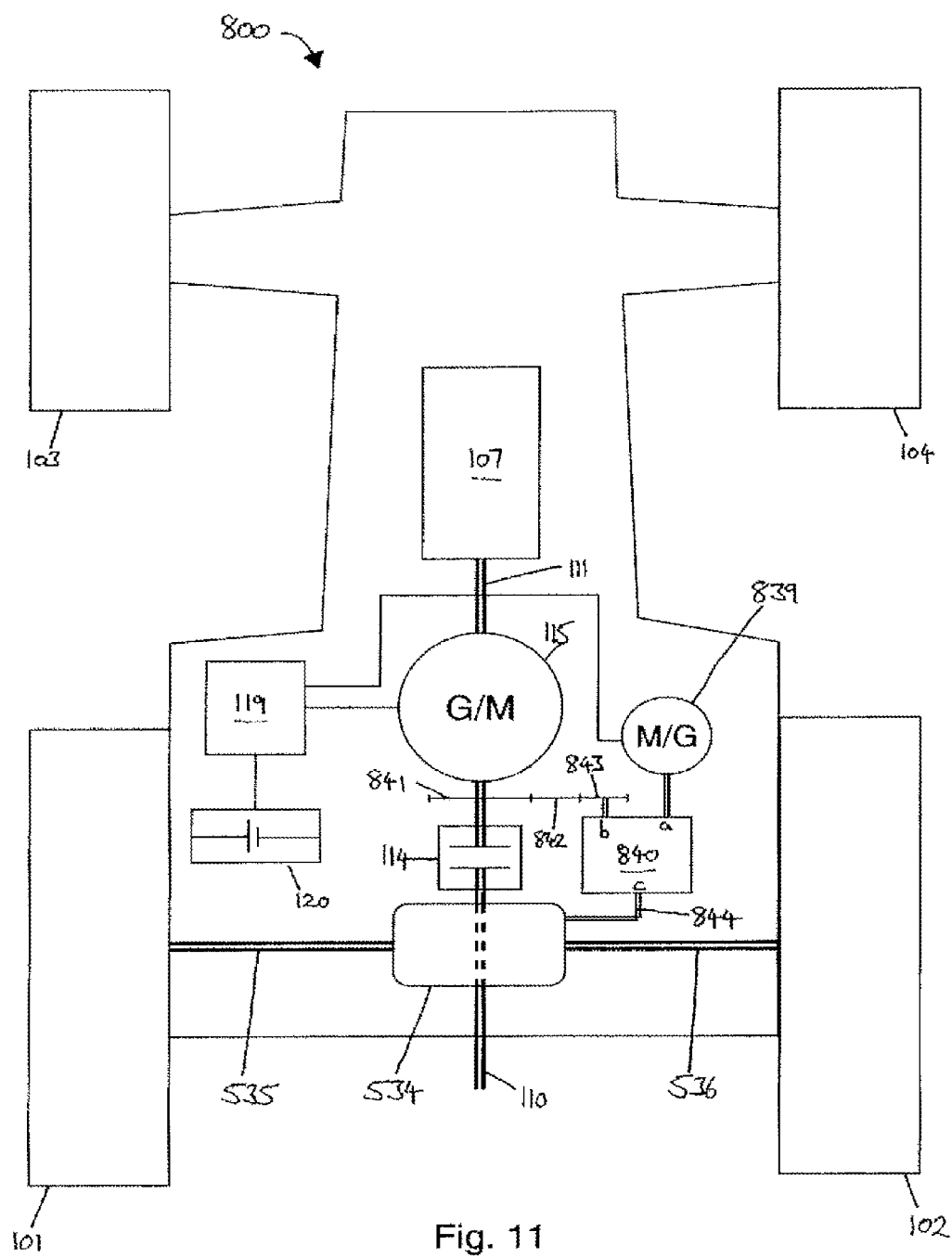
FIG. 11 is a schematic plan view of a tractor in accordance with an eighth embodiment of the invention; and, FIG. 12 is a schematic plan view of a tractor in accordance with a ninth embodiment of the invention.

With reference to FIG. 11, an eighth embodiment of the invention is shown in the form of a tractor 800. As in previously described embodiments, the tractor 800 comprises an engine 107 drivingly connected to a PTO shaft 110 via a PTO clutch 114. A first motor/generator 115 is drivingly connected to the driveshaft 111 running from the engine 117. Electrical energy generated by the first motor/generator 115 is conveyed to power control unit 119 for distribution to a single propulsion motor/generator 839 or to battery 120.

Propulsion motor/generator 839 is drivingly connected to a first input/output of an epicyclic gearbox 840. Driveshaft 111 is drivingly connected to a second input/output of the epicyclic gearbox 840 via meshed gears 841, 842, 843. The torque generated by the drive shaft 111 is summed with the torque generated by the propulsion motor/generator 839 by the epicyclic gearbox 840 and transmitted to a rear differential gearbox 534 via a drive connection 844. Therefore, the rear wheels 101, 102 can be powered by a mechanical drive connection to the engine 107 and/or the propulsion motor/generator 839.

It should be appreciated from FIG. 11 that tractor 800 is set up for two-wheel drive. However it should be appreciated that any of the aforementioned front drive means may be exploited to provide four-wheel drive.

Figure 12:
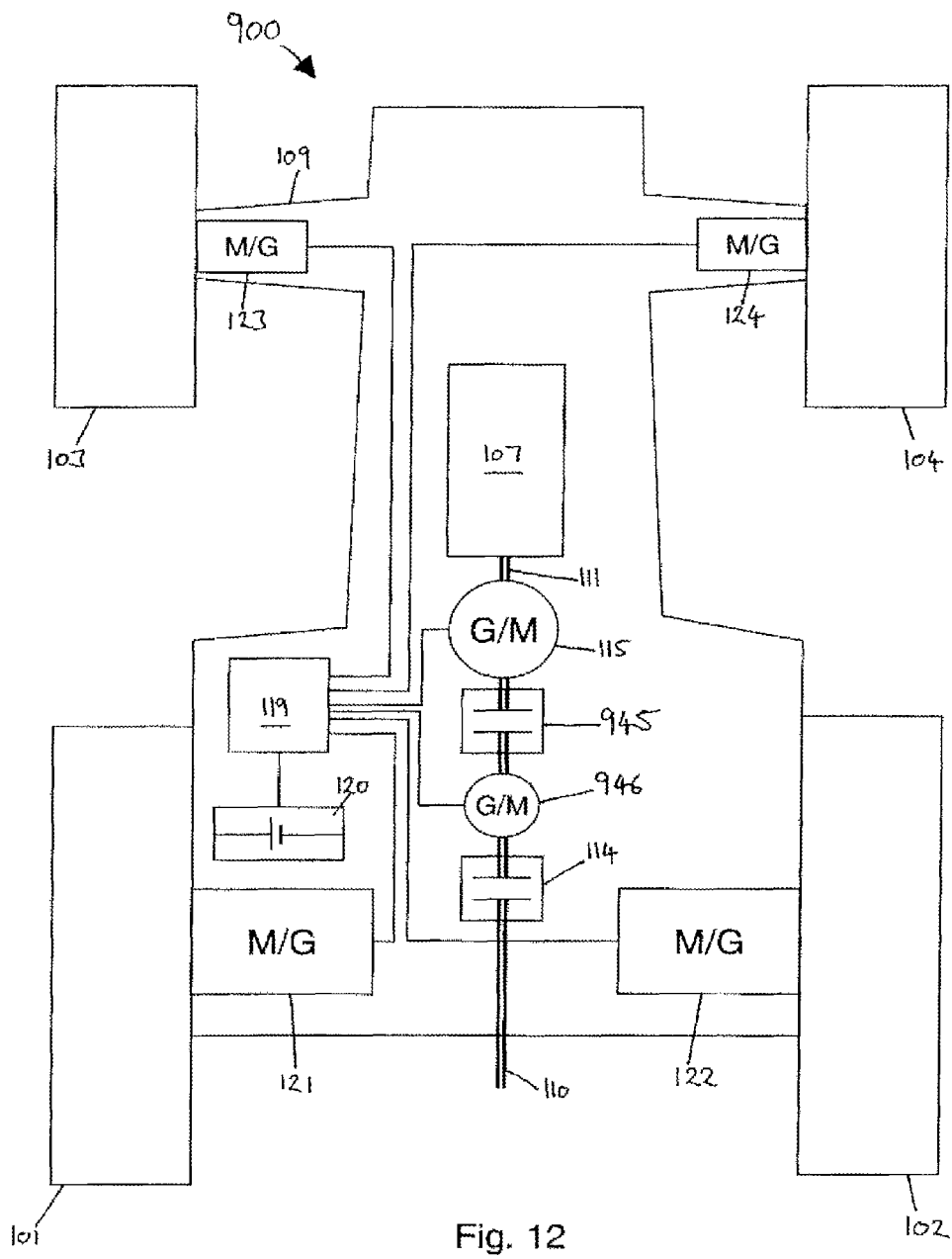

With reference to FIG. 12, a ninth embodiment of the invention is shown in the form of a tractor 900. The embodiment of FIG. 12 involves a modification to the first embodiment (FIG. 2) of which some common parts will not be described any further.

PTO shaft 110 is driven by a mechanical drive connection to the engine 107 via a PTO clutch 114 and an auxiliary clutch 945. The PTO clutch 114 is located 'downstream' of the auxiliary clutch 945 and operates as described above in relation to the other embodiments. The auxiliary clutch 945 is positioned 'in-line' of the driveshaft 111 so as to selectively connect an auxiliary motor/generator 946 to the engine 107.

In a first 'normal' mode of operation, both clutches 114, 945 are closed and the engine 107 powers the PTO shaft. Both motor/generators 115, 946 serve as generators and deliver electrical energy to the battery 120 and/or the propulsion motors 121 to 124. This 'normal' mode is suited to PTO applications that demand maximum power.

In a second 'low power' mode, auxiliary clutch 945 is opened, thereby disconnecting the auxiliary motor/generator 946 and PTO shaft 110 from the engine 107. Auxiliary motor/generator 946 serves as a motor and is powered by electrical energy stored by the battery 120 and generated by main motor/generator 115. This low power mode is particularly attractive for PTO applications which demand low power and/or can benefit from variable speed.

The low power mode described above can also be utilised momentarily upon starting of the PTO shaft 110. Existing PTO drive systems suffer from the sudden increase in torque placed upon the PTO shaft upon starting. This often results in failure of the shear bolt provided. The embodiment described above and shown in FIG. 12 overcomes this problem by disconnecting the PTO shaft 110 from the engine 107 and using the auxiliary motor 946 to initialise rotation of the PTO shaft 110. Once the PTO shaft 110 is rotating at a speed that is above a predetermined threshold, the auxiliary clutch 945 is closed and the engine 107 assumes drive of the PTO shaft 110 via the mechanical drive connection 111.

Although a motor/generator 115 is provided in all of the described embodiments to generate electrical energy from the engine torque, it should be understood that this can be replaced by a generator without deviating from the scope of the invention. The use of a combined motor/generator, however, allows a parallel hybrid PTO drive to be provided.

In a similar vein, each propulsion motor/generator can be replaced with a simple motor which does not recover energy upon braking but is cheaper.

It should be understood that the diesel engine of the above-described embodiments can be replaced with any practical internal combustion engine, powered by any combustible fuel.

The invention claimed is:

1. An agricultural tractor for use with an implement selectively attached to the tractor, the tractor comprising a tractor frame providing a supporting chassis, an internal combustion engine for delivering torque, wheels or tracks for imparting a propulsive force to the ground, and a power takeoff shaft which terminates in a stub external to the supporting chassis for delivering torque to an implement selectively attached thereto, a mechanical drive connection between the engine and the power takeoff shaft, an electrical generator drivingly connected to the engine, and at least one electrical motor arranged to deliver a propulsion force to the wheels or tracks, the at least one electrical motor being electrically connected to, and powered by, the electrical generator, wherein the mechanical drive connection between the engine and the power takeoff shaft includes a power takeoff clutch to allow disengagement of the power takeoff shaft from torque delivered by the electrical motor, further comprising a power takeoff drive electrical motor being electrically connected to, and powered by, the electrical generator, the power takeoff drive electrical motor being drivingly connected to the power takeoff shaft on an output side of the power takeoff clutch so that the power takeoff shaft can be driven by the power takeoff drive electrical motor independently of the engine when the power takeoff clutch is disengaged, characterised in that the tractor further comprises a battery connected to the electrical generator and to the electrical motor, wherein said electrical generator is provided as a first motor/generator drivingly connected to the engine, and to which the battery is connected so that electrical energy can be passed therebetween, wherein the first motor/generator can operate as a motor so that the power takeoff shaft is at least partially powered by electrical energy from the battery.

2. A tractor according to claim 1, wherein the first motor/generator is driven directly from said mechanical drive connection between the engine and the power takeoff shaft.

3. A tractor according to claim 1, wherein said electrical motor is provided as a second motor/generator which provides said electrical motor arranged to deliver a driving force to the wheels or tracks; and to which the battery is connected so that electrical energy can be passed therebetween, wherein the second motor/generator can operate as a generator which converts torque recovered from the wheels or tracks into electrical energy which can be delivered to, and stored in, the battery.

4. A tractor according to claim 1, comprising a front pair of wheels or tracks and a rear pair of wheels or tracks, wherein each wheel or track has associated therewith a respective electric motor arranged to deliver a propulsion force to the wheel or track via a respective mechanical drive connection, each electrical motor being electrically connected to, and powered by, the electrical generator.

5. An agricultural tractor for use with an implement selectively attached to the tractor, the tractor comprising:
a tractor frame providing a supporting chassis;
an internal combustion engine for delivering torque;
ground engaging members for imparting a propulsive force to move the tractor over ground, wherein the ground engaging members are at least one of wheels or tracks; and
a power takeoff shaft which terminates in a stub external to the supporting chassis for delivering torque to implements attached thereto;
a mechanical drive connection between the engine and the power takeoff shaft;
a first motor/generator which provides an electrical generator drivingly connected to the engine;
at least one electrical motor arranged to deliver a propulsion force to the ground engaging members, the at least one electrical motor being electrically connected to, and powered by, the first motor/generator;
a battery connected to the first motor/generator and to the at least one electrical motor, the battery connected to the first motor/generator so that electrical energy can be passed therebetween, wherein the first motor/generator can operate as a motor so that the power takeoff shaft is at bast partially powered by electrical energy from the battery; and
an auxiliary electrical motor drivingly connected, via an auxiliary clutch, to the mechanical drive connection between the engine and the power takeoff shaft, the auxiliary electrical motor positioned in-line of the mechanical drive connection between the engine and the power takeoff shaft and downstream of the auxiliary clutch, wherein when the auxiliary clutch is open the power takeoff shaft is driven by the auxiliary electrical motor which is electrically connected to, and powered by, the first motor/generator, wherein the auxiliary electrical motor is a motor/generator which can serve as an electrical generator driven by the mechanical drive connection when the auxiliary clutch is closed.

* * * * *